(12) United States Patent
Allen et al.

(10) Patent No.: US 9,348,659 B2
(45) Date of Patent: May 24, 2016

(54) LOCK RESOLUTION FOR DISTRIBUTED DURABLE INSTANCES

(71) Applicant: Microsoft Technology Licensing, LLC, Redmond, WA (US)

(72) Inventors: Nicholas A. Allen, Redmond, WA (US); Justin D. Brown, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 13/851,748

(22) Filed: Mar. 27, 2013

(65) Prior Publication Data

US 2013/0212590 A1 Aug. 15, 2013

Related U.S. Application Data

(63) Continuation of application No. 12/631,023, filed on Dec. 4, 2009, now Pat. No. 8,424,009.

(51) Int. Cl.
*G06F 9/46* (2006.01)
*G06F 9/52* (2006.01)

(52) U.S. Cl.
CPC .............. *G06F 9/524* (2013.01); *G06F 9/526* (2013.01); *G06F 2209/522* (2013.01)

(58) Field of Classification Search
None
See application file for complete search history.

(56) References Cited

U.S. PATENT DOCUMENTS

| | | |
|---|---|---|
| 5,721,904 A | 2/1998 | Ito |
| 6,073,140 A | 6/2000 | Morgan |
| 6,105,148 A | 8/2000 | Chung |
| 6,112,222 A | 8/2000 | Govindaraju |
| 6,442,748 B1 | 8/2002 | Bowman-Amuah |
| 6,457,003 B1 | 9/2002 | Gajda |
| 6,457,065 B1 | 9/2002 | Rich |
| 6,591,277 B2 | 7/2003 | Spence |
| 6,651,072 B1 | 11/2003 | Carino, Jr. et al. |
| 6,742,135 B1 * | 5/2004 | Wu .................... G06F 9/524 710/200 |
| 6,934,755 B1 | 8/2005 | Saulpaugh |
| 7,305,423 B2 | 12/2007 | Starbuck |

(Continued)

FOREIGN PATENT DOCUMENTS

| | | |
|---|---|---|
| JP | H11-65863 | 3/1999 |
| JP | 2001067238 | 3/2001 |

OTHER PUBLICATIONS

"Fourth Office Action received for Chinese Patent Application No. 201080054552.0", Mailed date: Aug. 28, 2014, 7 Pages.

(Continued)

*Primary Examiner* — Kenneth Tang
(74) *Attorney, Agent, or Firm* — Ben Tabor; Raghu Chinagudabha; Micky Minhas

(57) ABSTRACT

A command log selectively logs commands that have the potential to create conflicts based on instance locks. Lock times can be used to distinguish cases where the instance is locked by the application host at a previous logical time from cases where the instance is concurrently locked by the application host through a different name. A logical command clock is also maintained for commands issued by the application host to a state persistence system, with introspection to determine which issued commands may potentially take a lock. The command processor can resolve conflicts by pausing command execution until the effects of potentially conflicting locking commands become visible and examining the lock time to distinguish among copies of a persisted state storage location.

19 Claims, 4 Drawing Sheets

(56) References Cited

U.S. PATENT DOCUMENTS

| | | | |
|---|---|---|---|
| 7,313,727 | B2 | 12/2007 | Cabrera |
| 7,349,512 | B2 | 3/2008 | Rausch |
| 7,483,882 | B1 | 1/2009 | Bumgarner et al. |
| 8,037,476 | B1* | 10/2011 | Shavit .................. G06F 9/526 711/150 |
| 8,250,588 | B2 | 8/2012 | Allen et al. |
| 2002/0083252 | A1 | 6/2002 | Armstrong |
| 2005/0132250 | A1 | 6/2005 | Hansen |
| 2005/0138375 | A1* | 6/2005 | Sadjadi ............ G06F 17/30362 713/167 |
| 2005/0262310 | A1 | 11/2005 | Starbuck |
| 2005/0278341 | A1 | 12/2005 | Kostadinov |
| 2006/0020570 | A1 | 1/2006 | Wu |
| 2006/0136279 | A1 | 6/2006 | Maybee |
| 2007/0156486 | A1 | 7/2007 | Sanabria |
| 2008/0319957 | A1 | 12/2008 | Muralidhar |
| 2009/0282396 | A1 | 11/2009 | Boyer |
| 2010/0122239 | A1 | 5/2010 | Neufeld |
| 2010/0259614 | A1* | 10/2010 | Chen .................... G05D 1/0038 348/148 |

OTHER PUBLICATIONS

"Office Action received for Japanese Patent Application No. 2012-542028", Mailed date: Nov. 27, 2014, 4 Pages.

Notice of Allowance dated Oct. 23, 2013 cited in U.S. Appl. No. 13/484,911.

"Second Office Action Received for China Patent Application No. 201080054552.0", Mailed Date: Nov. 5, 2013, Filed Date: Nov. 5, 2010, 6 Pages.

"Third Office Action Received for China Patent Application No. 201080054552.0", Mailed Date: Apr. 3, 2014, Filed Date: Nov. 5, 2010, 7 Pages.

Office Action dated Apr. 05, 2013 cited in U.S. Appl. No. 13/484,911.

Fifth Office Action Received for Chinese Patent Application No. 201080054552.0, Mailed Date: Jan. 6, 2015, 6 Pages.

Lumpp, Th, et al., "From high availability and disaster recovery to business continuity solutions", IBM Systems Journal, vol. 47, No. 4, Jun. 3, 2008, pp. 605-619.

Wang, Lan, et al., "Persistent Detection and Recovery of State Inconsistencies", Aug. 8, 2006, 23 pages.

Rodriguez, Jesus, Window Workflow Foundation Runtime Services; The Persistence Service:, Oct. 5, 2005 14 pages.

Adya, Atul, et al., "Efficient Optimistic Concurrency Control Using Loosely Synchronized Clocks", Proceedings of the ACM SIGMOD International Conference on Management of Data, San Jose, CA, May 1995, 12 pages.

Raynal, Michel, et al. "Logical Time: Capturing Causality in Distributed Systems", Feb. 1996, pp. 49-56.

Liskov, Barbara, et al., "Providing Persistent Objects in Distributed Systems", Proceedings of ECOOP'99, 1999, 28 pages. (The month of Publication is irrelevant since the year of Publication is clearly prior to the filing of the Application).

Maria Del Mar Roldan-Garcia, "A Survey on Disk Oriented Querying and Reasoning on the Semantic Web", Prceedings of the 22nd International Conference on Data Engineering Workshops, 2006, 8 pages. (The month of Publication is irrelevant since the year of Publication is clearly prior to the filing of the Application).

MSDN, "Load Workflow Command Class", 2010 Microsoft Corporation, 2 pages. (The month of Publication is irrelevant since the year of Publication is clearly prior to the filing of the Application).

Rodriguez, Jesus, "Jesus Rodriguez's WebLog", Microsoft MVP BizTalk Server Oracle ACE, Oct. 5, 2005, 16 pages.

MSDN, "Instance Stores", 2010 Microsoft Corporation, 3 pages. (The month of Publication is irrelevant since the year of Publication is clearly prior to the filing of the Application).

Sun Microsystems, "Sun Java System Application Server 9.1 Developer's Guide", May 2008, 316 pages.

Kahlon, V. et al, "Reasoning about Threads Communicating via Locks Computer Aided Verification", Lecture Notes in Computer Science, 2005, vol. 3576/2005, pp. 267-274 (The month of Publication is irrelevant since the year of Publication is clearly prior to the filing of the Application).

Rajwaro, R. et al., "Transactional Execution: Toward Reliable, High-Performance Multithreading", IEEE Computer Society, IEEE Micro, 2003, vol. 23, No. 6, pp. 117-125. (The month of Publication is irrelevant since the year of Publication is clearly prior to the filing of the Application).

Notice of Allowance dated Mar. 13, 2012 cited in U.S. Appl. No. 12/485,771.

Notice of Allowance dated May 11, 2012 cited in U.S. Appl. No. 12/485,771.

Notice of Allowance dated Jun. 26, 2012 cited in U.S. Appl. No. 12/729,836.

Office Action dated Sep. 13, 2012 cited in U.S. Appl. No. 12/631,023.

Notice of Allowance dated Jan. 8, 2013 cited in U.S. Appl. No. 12/631,023.

\* cited by examiner

//LOCK RESOLUTION FOR DISTRIBUTED
DURABLE INSTANCES

CROSS-REFERENCE TO RELATED APPLICATIONS

This application is a continuation of U.S. patent application Ser. No. 12/631,023 filed on Dec. 4, 2009 and entitled "LOCK RESOLUTION FOR DISTRIBUTED DURABLE INSTANCES," which issued as U.S. Pat. No. 8,424,009 on Apr. 16, 2013, and which application is expressly incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Long-running applications, such as, for example, workflow applications, often benefit from periodically persisting their work to allow for the application to recover after errors, crashes, or machine failures. Persisting work permits applications to temporarily go idle and have their resources reassigned. To persist work, an application host coordinates the persisted state with runtime state to ensure that a consistent checkpoint is created. For example, the persisted state may need to coordinate with application transactions, message notifications, locks, local state caches, etc.

Computer systems are also substantially parallelized dividing work among multiple computation threads, cores, and processors, including executing many simultaneous long-running applications. Thus, an application host must employ careful bookkeeping to allow multiple simultaneous execution threads to interact with the persisted and runtime states. As the application host and state persistence system can be located on different machines, this coordination may further be embedded within a distributed system. The interactions between the application host and the state persistence system may thereby be subject to reordering even if an absolute order is placed on the execution threads at the application host. Moreover, persisted state may be identified by a variety of aliases, making it non-obvious that two execution threads are referencing the same state.

These conditions (as well as other combinations of conditions) can conspire to create complexities that would be unlikely in sequential systems. For example, an application host may be one of several similarly functioning programs competing to apply modifications to persisted state in a shared state persistence system. As there may be inherent races in such a system a portion of these modifications may be in conflict. Further, due to these complexities and despite using careful and correct bookkeeping, an application host can determine that it is in conflict with itself.

BRIEF SUMMARY

The present invention extends to methods, systems, and computer program products for resolving lock conflicts. Embodiments of the invention include methods for resolving lock conflicts between two or more execution threads attempting to lock an instance stored in an instance store. In some embodiments, a persistence provider receives a first command from a first execution thread included in an application host. The first command is configured to request acquisition of a lock for a first instance when one or more conditions are satisfied. The persistence provider records the first command in a command log. The persistence provider submits the first command to the instance store.

The persistence provider receives a second command from a second execution thread included in the application host. The second command is configured to request that a second instance be locked to the second execution thread for processing by the second command. The persistence provider records the second command in the command log. The persistence provider submits the second command to the instance store.

The persistence provider receives a lock response for the second command from the instance store. The lock response indicates that the application host is the holder of the lock for the second instance. The lock response is received subsequent to submitting the first command and prior to the completion of the first command.

The persistence provider refers to the command log to determine that the current resolution of the first command provides insufficient information to determine: (a) if the first command acquired a lock on the first instance and (b) if the first instance and second instance are the same instance. The insufficient information results in ambiguity with respect to whether or not the lock the second command requested was a lock previously acquired by the first command. The persistence provider pauses processing of the second command until reaching further resolution of the first command. Further resolution of the first command provides at least additional information regarding the one or more conditions being satisfied. The persistence provider determines that the first command acquired the lock the second command requested based on the additional information. The persistence provider fails the second command in response to the determination that the first command had acquired the lock.

In other embodiments, a persistence provider receives a first command from a first execution thread included in the application host. The first command is configured to request acquisition of a lock for a first instance. The persistence provider submits the first command to the instance store. The persistence provider receives a lock response for the first command from the instance store. The lock response indicates that the application host has acquired a lock for the first instance. The lock for the first instance is for a first instance version The persistence provider receives a second command from a second execution thread included in the application host. The second command is configured to request that a second instance be locked to the second execution thread for processing by the second command. The persistence provider submits the second command to the instance store. The persistence provider receives a lock response for the second command from the instance store. The lock response indicates that the application host has acquired a lock for the second instance. The lock for the second instance is for a second instance version.

The persistence provider determines that the first instance and second instance are the same instance. The persistence provider determines that the second instance version is a newer instance version than the first instance version. The persistence provider fails the first command in response to the determination that the first command is holding a lock for an obsolete instance version.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
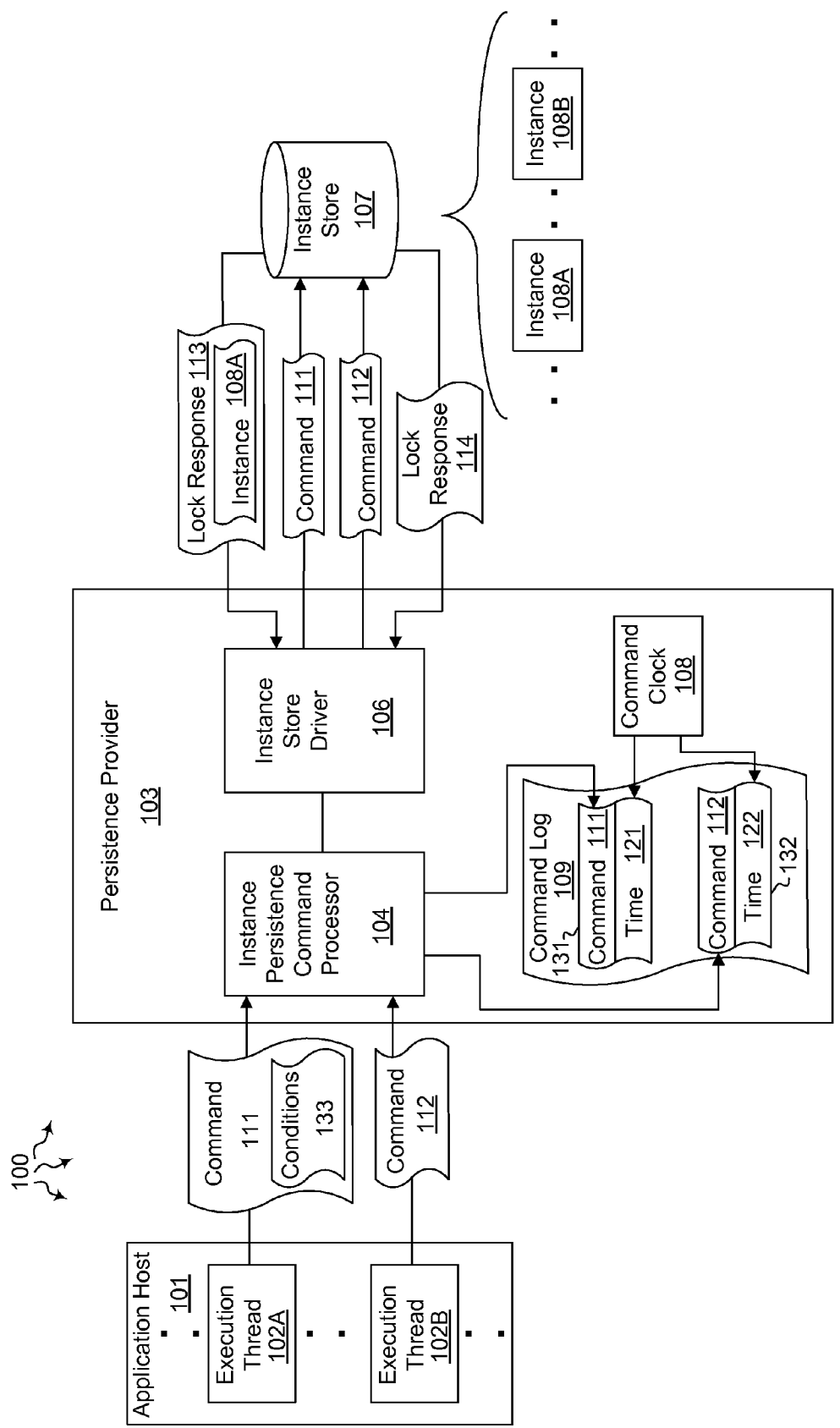
FIG. 1 illustrates an example computer architecture that facilitates resolving lock conflicts.

The present invention extends to methods, systems, and computer program products for resolving lock conflicts. Embodiments of the invention include methods for resolving lock conflicts between two or more execution threads attempting to lock an instance stored in an instance store. In some embodiments, a persistence provider receives a first command from a first execution thread included in an application host. The first command is configured to request acquisition of a lock for a first instance when one or more conditions are satisfied. The persistence provider records the first command in a command log. The persistence provider submits the first command to the instance store.

The persistence provider receives a second command from a second execution thread included in the application host. The second command is configured to request that a second instance be locked to the second execution thread for processing by the second command. The persistence provider records the second command in the command log. The persistence provider submits the second command to the instance store.

The persistence provider receives a lock response for the second command from the instance store. The lock response indicates that the application host is the holder of the lock for the second instance. The lock response is received subsequent to submitting the first command and prior to the completion of the first command.

The persistence provider refers to the command log to determine that the current resolution of the first command provides insufficient information to determine: (a) if the first command acquired a lock on the first instance and (b) if the first instance and second instance are the same instance. The insufficient information results in ambiguity with respect to whether or not the lock the second command requested was a lock previously acquired by the first command. The persistence provider pauses processing of the second command until reaching further resolution of the first command. Further resolution of the first command provides at least additional information regarding the one or more conditions being satisfied. The persistence provider determines that the first command acquired the lock the second command requested based on the additional information. The persistence provider fails the second command in response to the determination that the first command had acquired the lock.

In other embodiments, a persistence provider receives a first command from a first execution thread included in the application host. The first command is configured to request acquisition of a lock for a first instance. The persistence provider submits the first command to the instance store. The persistence provider receives a lock response for the first command from the instance store. The lock response indicates that the application host has acquired a lock for the first instance. The lock for the first instance is for a first instance version The persistence provider receives a second command from a second execution thread included in the application host. The second command is configured to request that a second instance be locked to the second execution thread for processing by the second command. The persistence provider submits the second command to the instance store. The persistence provider receives a lock response for the second command from the instance store. The lock response indicates that the application host has acquired a lock for the second instance. The lock for the second instance is for a second instance version.

The persistence provider determines that the first instance and second instance are the same instance. The persistence provider determines that the second instance version is a newer instance version than the first instance version. The persistence provider fails the first command in response to the determination that the first command is holding a lock for an obsolete instance version.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates resolving lock conflicts. Referring to FIG. 1, computer architecture 100 includes application host 101, persistence provider 103, and instance store 107. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Application host 101 includes a plurality of execution threads, including execution threads 102A and 102B. Generally, execution threads are configured to issue (e.g., persistence) commands for interacting with instances in instance store 107. Application host 101 can be an entity, such as, for example, a program or administrative tool and execution threads can be modules within application host 101 that manipulate instances stored in instance store 107.

Within application host 101, execution threads 102A, 102B, etc., can correspond to a program sequence of a long-running application. However, an execution thread may not directly correspond to the computation threads provided by the operating system. For example, in an application host runtime that supports asynchronous execution or resumption from continuation points, the binding of an execution thread to a computation thread may be dynamic and transient. Thus, some or all of the application host execution threads may be executing simultaneously on one or more computation threads.

Each execution thread of application host 101, including execution threads 102A and 102B, is configured to perform many of the functions of application host 101. For example, an execution thread can be configured to request an instance handle for the instance store from the persistence provider, submit commands to the instance persistence command processor, and receive persisted application state responsive to the submitted commands. Thus, generally references made to functions being performed by an application host can include functions performed by execution threads of the application host.

Instance store 107 provides durable storage for instances, such as, for example, instance 108A and 108B. Instance store 107 is configured to receive and process (e.g., persistence) commands for interacting with instances. Instance store 107 can persist application state as well as return persisted state to a requesting entity (e.g., an execution thread) in response to persistence commands.

Generally, persistence provider 103 is configured to translate persistence commands received from an execution thread into commands compatible with instance store 107. For example, persistence provider 103 can translate persistence commands from execution thread 102A or 102B into persistence commands compatible with instance store 107.

As depicted, persistence provider 103 includes instance persistence command processor 104, instance store driver 106, command clock 108, and command log 109. Instance persistence command processor 104 defines a contract between application host 101 and instance store 107. As such, instance persistence command processor 104 is an interface between application host 101 and instance store 107 that permits application host 101 to provide commands that modify or inspect instance store 107. For example, the combination of an instance persistence command processor 104 and an instance store 107 implemented using SQL Server might be called a SQL persistence provider. The persistence provider modifies the state of the instance store according to a host's commands using a set of permissible state modifications defined by instance persistence command processor 104.

Generally, command log 109 is configured to track commands submitted by an application host for which the command results and/or effects have not yet been made visible to the application host. Commands tracked in command log 109 can be referred to as "in flight" commands.

Command clock 108 is a monotonically increasing counter used to create partial causality order among the submission of commands and/or receipt of command results by the execution threads of an application host.

Accordingly, command clock 108 is configured to maintain a logical time for persistence provider 103. When appropriate, commands received at persistence provider 103 can be time stamped using a time from command clock 108 and logged into command log 109. As such, command clock 108 facilitates a temporal understanding of the order commands are received. Instance persistence command processor 103 can use this temporal understanding (along with other information) when resolving lock conflicts (e.g., between competing execution threads of application host 101).

It may be that some but not all commands are logged into command log 109. When determining whether or not to log a command in command log 109, persistence provider 103 can distinguish between commands that have potential to cause a lock conflict and commands that have no potential to cause a lock conflict. Commands that can potentially cause a lock conflict are logged in command log 109. On the other hand, commands that have no potential to cause a lock conflict may be allowed to execute without logging.

Some commands can be determined to have no potential to cause a lock conflict due to being a type of command that definitely does not request acquisition of any lock. For example, commands that request uncoordinated read access to an instance have little, if any, potential to conflict with other commands and thus may be allowed to execute without logging (since these commands do not request acquisition of a lock).

On the other hand, commands determined to potentially cause a lock conflict can be logged in command log 109. When a command is received, instance persistence command processor 104 may have insufficient information to determine if the command is to request acquisition of a lock for an instance that is already locked. For example, it may be that an instance is identifiable using a variety of different aliases. Thus, upon receiving a command including an instance alias, it may not be readily apparent what instance the instance alias refers to. As such, instance persistence command processor 104 is unable to classify the command as a command that has no potential to cause lock conflict until further information (resolution of the alias to an instance handle) is obtained.

Whether or not a command requests acquisition of a lock can depend on various conditions associated with the command being satisfied. Information both internal and external (e.g., time, date, etc.) to persistence provider 103 can be utilized to determine if associated conditions are satisfied. Further, persistence provider 103 can become aware of information related to different associated conditions at different times, including before or after a command is received at instance persistence command processor 104. Thus, a detected potential to cause a lock conflict can be removed when additional information becomes available. For example, a command that requests acquisition of a lock if it is Wednesday can initially be logged in command log 109. However, upon persistence provider 103 becoming aware that it is Thursday, the command can be removed from command log 109.

In some embodiments, a command itself may contain information indicating the possibility of requesting acquisition of a lock. As such, instance persistence command processor 104 can ask the command if there is some possibility of it requesting acquisition of a lock. In other embodiments, a list of commands that definitely do not request acquisition of a lock is maintained. When a command is received, instance persistence command processor 104 can refer to the list.

Generally, instance store driver 106 is configured to break down commands when necessary for compatible communication with instance store 107. For example, an application host command set may lack a particular command from an instance store command set. However, it may be that using a combination of two or more commands from an instance store command set, that a command from an application host command set can be realized. Thus, when persistence provider 103 detects that a received persistence command is not included in an instance store command set, persistence provider 103 can refer to instance store driver 106 to break the command down into other compatible commands.

From time to time, execution threads 102A, 102B, etc, can submit commands to persistence provider 103. When appropriate, received commands can be time stamped by command clock 108 and stored in command log 109.

Figure 3:
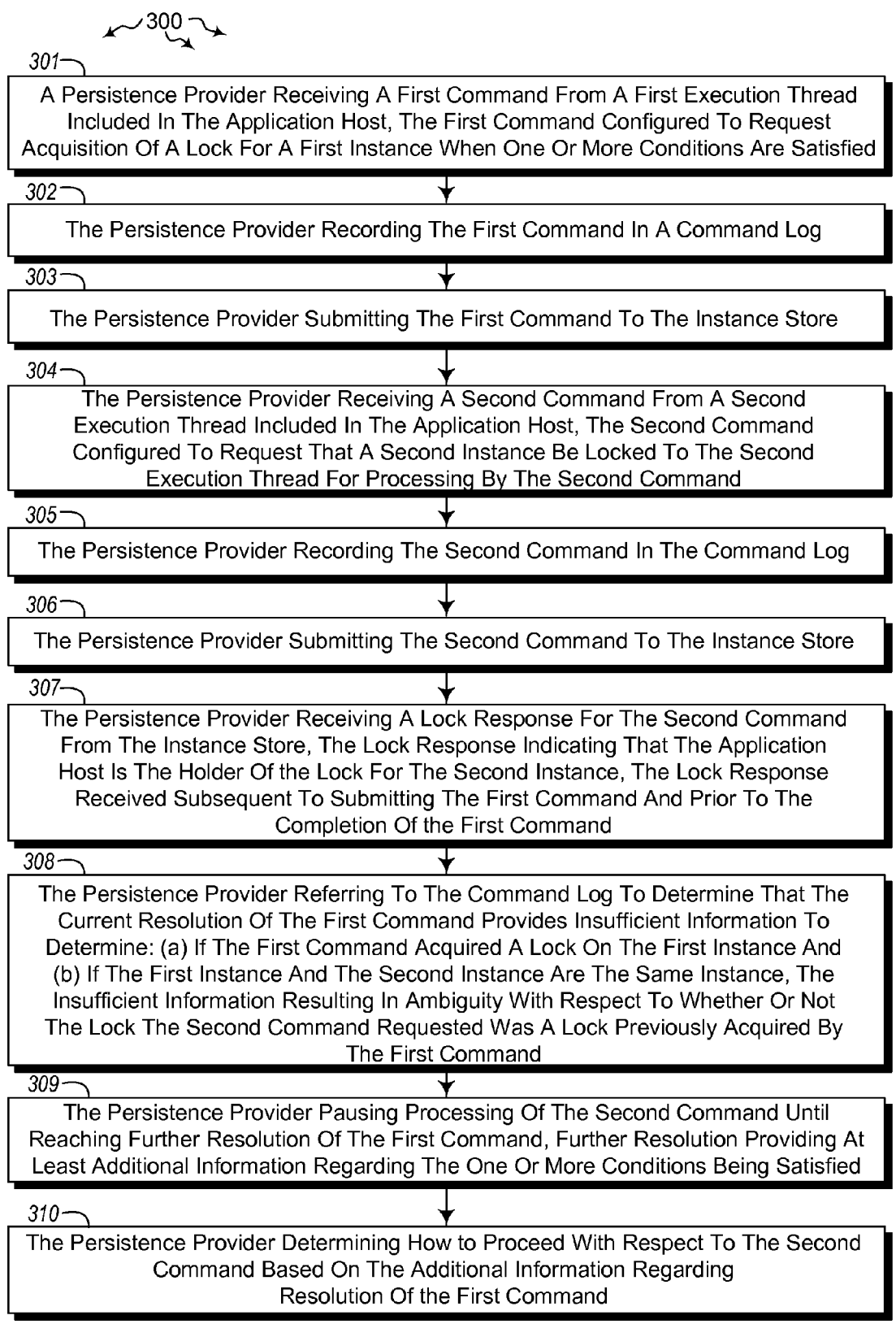
FIG. 3 illustrates a flow chart of an example method for resolving lock conflicts.

FIG. 3 illustrates a flow chart of an example method 300 for resolving a lock conflict between two or more execution threads. Method 300 will be described with respect to the components and data of computer architecture 100.

Method 300 includes an act of a persistence provider (e.g., persistence provider 103) receiving a first command from a first execution thread included in the application host, the first command configured to request acquisition of a lock for a first instance when one or more conditions are satisfied (act 301). For example, instances persistence command processor 104 can receive command 111, including conditions 133, from execution thread 102A. Command 111 is configured to request acquisition of a lock for instance 108A when conditions 133 are satisfied. Conditions 133 can represent a conditional statement, such as, for example, "if today is Wednesday take a lock".

Method 300 includes an act of the persistence provider recording the first command in a command log (act 302). For example, upon receiving command 111, instance persistence command processor 104 may have insufficient information to determine with certainty that command 111 has no potential to cause a lock conflict (e.g., instance persistence command processor 104 may not know whether it is Wednesday). As such, instance persistence command processor 104 records command 111 in command log 109. In some embodiments, entries in command log 109 include a command and time stamp from command clock 108. For example, entry 131 includes command 111 and time 121.

Method 300 includes an act of the persistence provider submitting the first command to the instance store (act 303). For example, instance store driver 106 can submit command 111 to instance store 107.

Method 300 includes an act of the persistence provider receiving a second command from a second execution thread included in the application host, the second command configured to request that a second instance be locked to the second execution thread for processing by the second command (act 304). For example, instance persistence command processor 104 receives command 112 from execution thread 102B. Command 112 is configured to request that a second instance be locked to execution thread 102B for processing by command 112.

Method 300 includes an act of the persistence provider recording the second command in the command log (act 305). For example, upon receiving command 112, instance persistence command provider 104 may have insufficient information to determine with certainty that command 112 has no potential to cause a lock conflict. For example, instance persistence command processor 104 may lack information for determining if an alias in command 112 refers to an instance for which lock acquisition has already been requested. As such, instance persistence command processor 104 records entry 132, including command 112 and time 122 (a time after time 121), in command log 109.

Method 300 includes an act of the persistence provider submitting the second command to the instance store (act 306). For example, instance store driver 106 can submit command 112 to instance store 107.

Method 300 includes an act of the persistence provider receiving a lock response for the second command from the instance store, the lock response indicating that the application host is the holder of the lock for the second instance, the lock response received subsequent to submitting the first command and prior to the completion of the first command (act 307). For example, instance store driver 106 can receive lock response 114 from instance store 107. Lock response 114 can indicate that application host 101 is the holder of the lock for instance 108A. Lock response 114 can be received subsequent to submitting command 111 and prior to completing command 111 (e.g., instance store driver 106 may not yet have received lock response 113).

Method 300 includes an act of the persistence provider referring to the command log to determine that the current resolution of the first command provides insufficient information to determine: (a) if the first command acquired a lock on the first instance and (b) if the first instance and second instance are the same instance, the insufficient information resulting in ambiguity with respect to whether or not the lock the second command requested was a lock previously acquired by the first command (act 308). For example, persistence provider 103 may have insufficient information to determine if command 111 acquired a lock and/or if commands 111 and 112 reference the same instance. The insufficient information results in ambiguity with respect to whether the lock requested by command 112 was previously obtained by command 111.

The persistence provider may exclude commands in the command log that can be determined to have no potential to cause a lock conflict due to the commands only referencing instances that are definitely not instance 108A. For example, instance persistence command processor 104 may determine that a command in command log 109 has unresolved instance aliases that are known to not be any of the aliases for instance 108A.

Method 300 includes an act of the persistence provider pausing processing of the second command until reaching further resolution of the first command, further resolution providing at least additional information regarding the one or more conditions being satisfied (act 309). For example, persistence provider 103 can pause processing command 112 until reaching further resolution of command 111. The further resolution of command 111 can provide information regarding conditions 133 being satisfied. For example, if command 111 requests a lock for an unresolved instance alias, persistence provider 130 can pause processing command 112 until the instance alias is resolved to a specific instance. Further, it may be that persistence provider 103 receives lock response 113, indicating that command 111 has acquired a lock on instance 108A (and thus any alias in command 111 referenced instance 108A).

Method 300 includes an act of the persistence provider determining how to proceed with respect to the second command based on the additional information regarding the resolution of the first command (act 310). In some embodiments the persistence provider determines that the first command acquired a lock the second command requested based on the additional information. For example, instance persistence command processor 104 can determine that command 111 acquired a lock on instance 108A. Instance persistence command processor 104 can also determine that command 112 received lock response 114 because command 112 also requested a lock of instance 108A (but after the lock of instance 108A was already acquired by command 111). When appropriate, instance persistence command processor 104 can refer to command log 109 to determine that command 111 was received prior to command 112. In these embodiments, the persistence provider fails the second command in response to the determination that the first command had acquired the lock. For example, persistence provider 103 can fail command 112 in response to determining that command 111 had acquired the lock on instance 108A.

In other embodiments, the persistence provider determines that the first command did not acquire the lock the second command requested based on the additional information. For example, instance persistence command processor 104 can determine that command 111 did not acquire a lock on instance 108A. In these other embodiments, an application host can be directed to attempt to override the lock indicated by the lock response received for the second command. For example, application host 101 can be directed to attempt to override the lock indicated in lock response 114 for command 112.

One reason for overriding a lock is that it may be determined that the lock is a spurious lock. For example, a lock left may be left over from a previous computation that has been forgotten by the application host. Thus, the lock existed at the time the second command was received by the instance store but the application host has no record of the lock when the second command response is received. A spurious lock can be detected when all of the previously issued commands potentially conflicting with the second command turn out to not have acquired the lock.

Alternately, persistence provider 103 can direct application host 101 to use the copy of instance 108A that is already locked to command 111.

Embodiments of the invention also include resolving lock conflicts including additional commands. For example, a persistence provider can receive a third command from a third execution thread included in the application host. The third command can be configured to request acquisition of a lock for a third instance when one or more conditions are satisfied. The persistence provider can record the third command in a command log.

The persistence provider submits the third command to the instance store. The persistence provider refers to the command log to determine that the current resolution of the third command provides insufficient information to determine: (a) if the third command acquired a lock on the third instance and (b) if the third instance and second instance are the same instance. The insufficient information results in ambiguity with respect to whether or not the lock the second command (e.g., command 112) requested was a lock previously acquired by the third command.

The persistence provider pauses processing of the second command until reaching further resolution of the third command. Further resolution provides at least additional information regarding the one or more conditions being satisfied. The persistence provider determines how to proceed with respect to the second command based on the additional information regarding the resolution of the third command.

Figure 2:
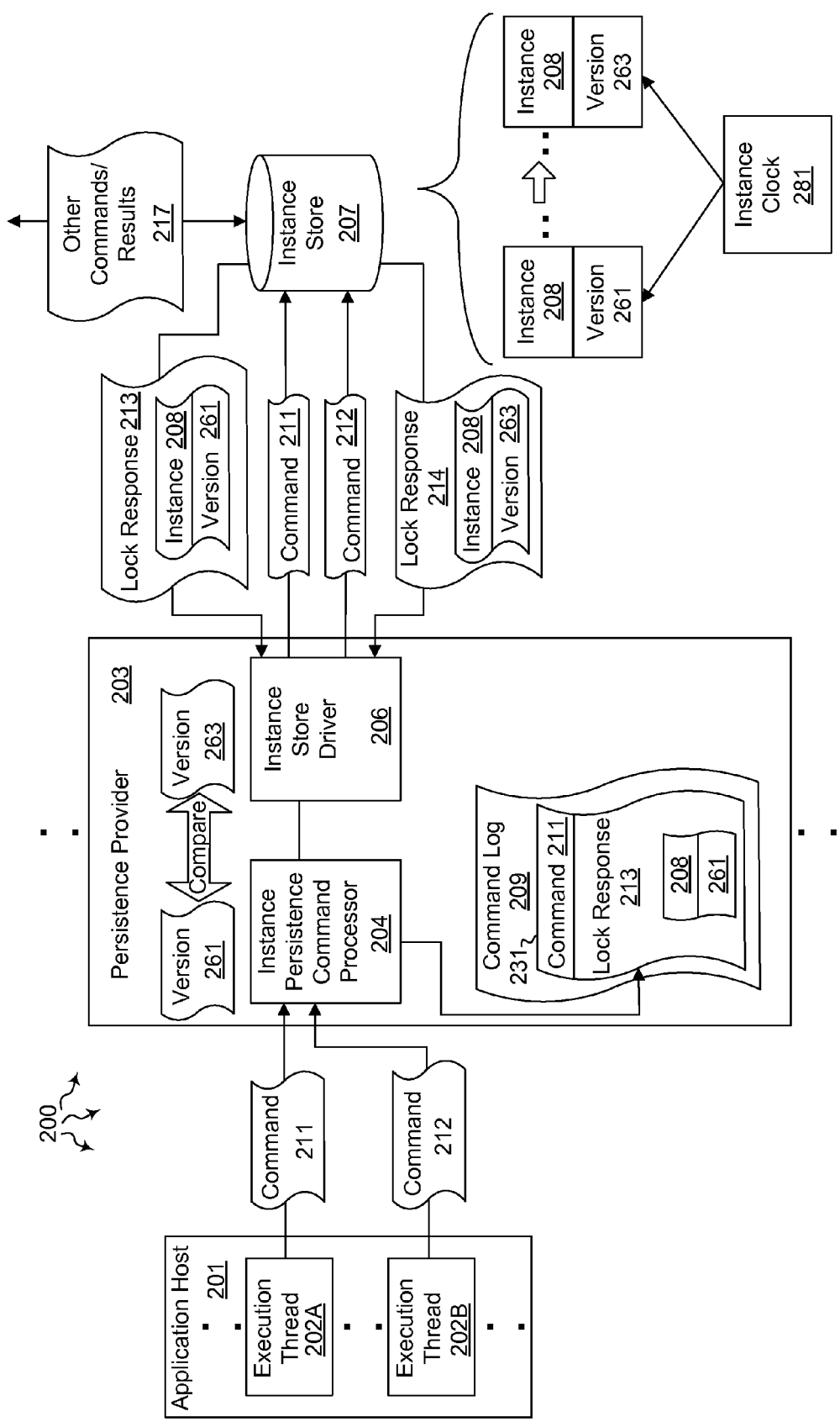
FIG. 2 illustrates another example computer architecture that facilitates resolving lock conflicts.

FIG. 2 illustrates an example computer architecture 200 that facilitates resolving lock conflicts. Referring to FIG. 2, computer architecture 200 includes application host 201, persistence provider 203, and instance store 207. Similar to computer architecture 100, each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Within FIG. 2, similarly labeled components from FIG. 1 include similar functionality. For example, application host 201 includes a plurality of execution threads, including execution threads 202A and 202B. Generally, execution threads are configured to issue (e.g., persistence) commands for interacting with instances in instance store 207. Application host 201 can be an entity, such as, for example, a program or administrative tool and execution thread can be modules within application host 201 that manipulate instances stored in instance store 207

Instance store 207 provides durable storage for instances, such as, for example, instance 208. Instance store 207 is configured to receive and process (e.g., persistence) commands for interacting with instances. Instance store 207 can persist application state as well as return persisted state to a requesting entity (e.g., an execution thread) in response to persistence commands.

Generally, persistence provider 203 is configured to translate persistence commands received from an execution thread into commands compatible with instance store 207. For example, persistence provider 203 can translate persistence commands from execution thread 202A or 202B into persistence commands compatible with instance store 207.

As depicted, persistence provider 203 includes instance persistence command processor 204, instance store driver 206, and command log 209. Instance persistence command processor 204 defines a contract between application host 201 and instance store 207. As such, instance persistence command processor 204 is an interface between application host 201 and instance store 207 that permits application host 201 to provide commands that modify or inspect instance store 207. For example, the combination of an instance persistence command processor 204 and an instance store 207 implemented using SQL Server might be called a SQL persistence provider. The persistence provider modifies the state of the instance store according to a host's commands using a set of permissible state modifications defined by instance persistence command processor 204.

Similar to functionality at persistence provider 103, it may be that some but not all commands are logged into command log 209. When determining whether or not to log a command in command log 209, persistence provider 203 can distinguish between commands that have potential to cause a lock conflict and commands that have no potential to cause a lock conflict. Commands that can potentially cause a lock conflict are logged in command log 209. On the other hand, commands that have no potential to cause a lock conflict may be allowed to execute without logging. Instance persistence command processor 204 can make these determinations similar to how command processor 104 makes determinations with respect to logging a command in command log 109.

Generally, instance store driver 206 is configured to break down commands when necessary for compatible communication with instance store 207. For example, an application host command set may lack a particular command from an instance store command set. However, it may be that using a combination of two or more commands from an instance store command set, that a command from an application host command set can be realized. Thus, when persistence provider 203 detects that a received persistence command is not included in an instance sore command set, persistence provider 203 can refer to instance store driver 206 to break the command down into other compatible commands.

As depicted, instance store 207 includes instance clock 281. Instance clock 281 is configured to maintain versions for instances stored in instance store 207. Instance clock 281 can maintain versions in accordance with version update rules that define when a version is to be updated. For example, version update rules can dictate that an instance version is to be updated (incremented) when an exclusive lock is taken for an instance, each time an exclusive lock is released for an instance, when persisted state associated with an instance is modified, etc. Maintaining instance versions can include incrementing a counter when a version is to be updated. For example, upon modifying data from an instance currently at version 3, the instance can be incremented to version 4. Persistence provider 203 can use instance versions when resolving lock conflicts.

From time to time, execution threads 202A, 202B, etc, can submit commands to persistence provider 203. Also as depicted, other commands/results 217 can be communicated to/from instance store 207 and other applications hosts (possibly through other intermediary persistence providers). Thus, application host 201 as well as other application hosts can interact with instance store 207, potentially causing instance versions to change. For example, in response to received commands (from application host 201 and/or other application hosts) instance 208 can transition from version 261 (an earlier version) to version 263 (a later version).

Figure 4:
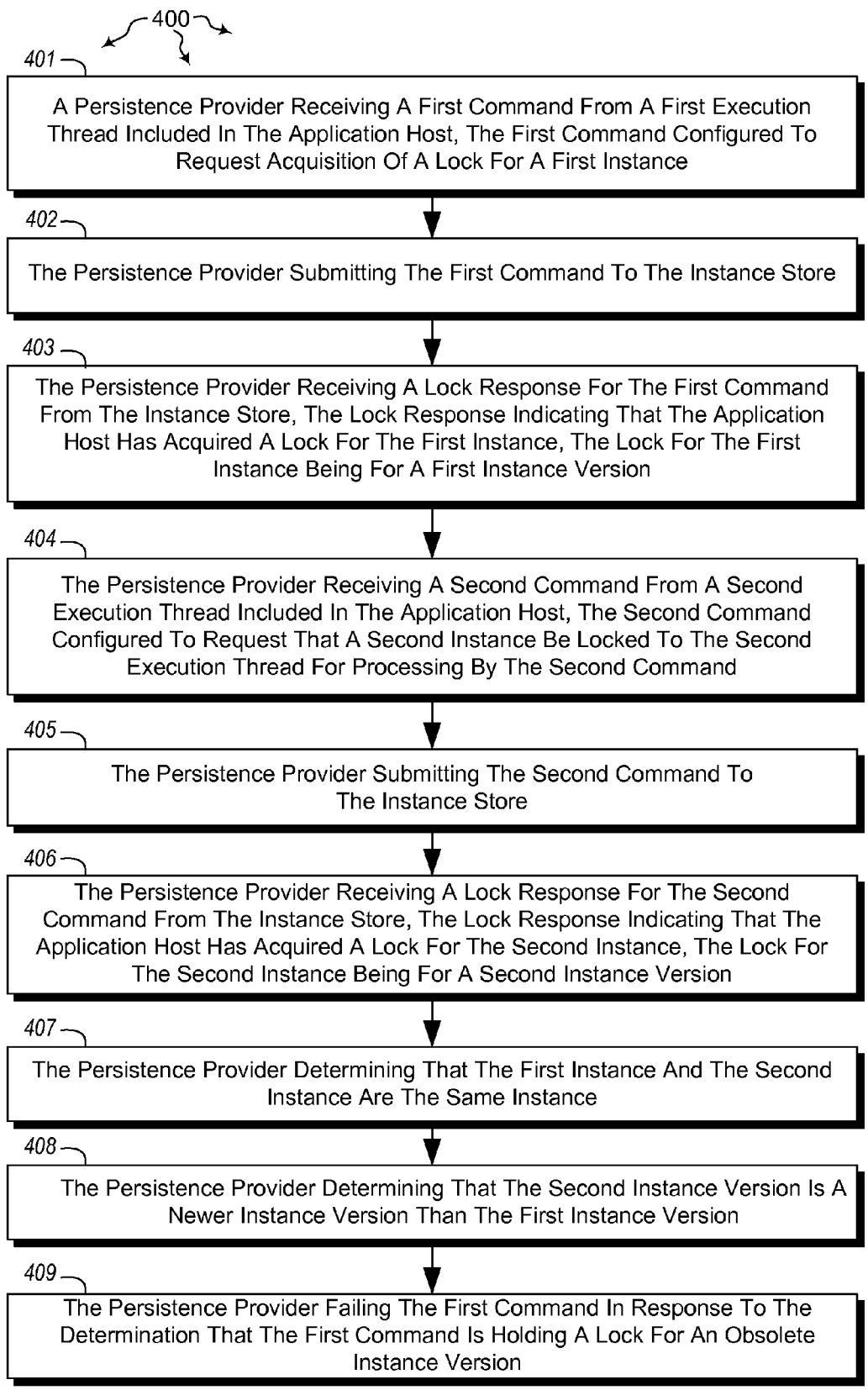
FIG. 4 illustrates a flow chart of another example method for resolving lock conflicts.

FIG. 4 illustrates a flow chart of an example method 200 for resolving a lock conflict between two or more execution threads. Method 400 will be described with respect to the components and data of computer architecture 200.

Method 400 includes an act of a persistence provider receiving a first command from a first execution thread included in the application host, the first command configured to request acquisition of a lock for a first instance (act 401). For example, instance persistence command processor 204 can receive command 211 from execution thread 202A. Command 211 can be configured to request acquisition of a lock for instance 208.

Method 400 includes an act of the persistence provider submitting the first command to the instance store (act 402). For example, instance store driver 206 can submit command 211 to instance store 207.

Method 400 includes an act of the persistence provider receiving a lock response for the first command from the instance store, the lock response indicating that the application host has acquired a lock for the first instance, the lock for the first instance being for a first instance version (act 403). For example, instance store driver 206 can receive lock response 213 from instance store 207. Lock response 213 indicates that command 211 has locked version 261 of instance 208. Instance persistence provider 204 can log entry 231 in command log 209. As depicted, entry 231 associates command 211 with lock response 213.

Method 400 includes an act of the persistence provider receiving a second command from a second execution thread included in the application host, the second command configured to request that a second instance be locked to the second execution thread for processing by the second command (act 404). For example, instance persistence command processor 204 can receive command 212 from execution thread 202B. Command 212 can be configured to request acquisition of a clock for instance 208.

Method 400 includes an act of the persistence provider submitting the second command to the instance store (act 405). For example, instance store driver 206 can submit command 212 to instance store 207.

Method 400 includes an act of the persistence provider receiving a lock response for the second command from the instance store, the lock response indicating that the application host has acquired a lock for the second instance, the lock for the second instance being for a second instance version (act 406). For example, instance store driver 206 can receive lock response 214 from instance store 207. Lock response 214 indicates that command 212 has locked version 263 of instance 208.

As previously described, other applications hosts can interact with instance store 207 (as indicated by other commands/results 217). Thus, it may be that commands 211 and 212 are interspersed with other commands (from other application hosts) received at instance store 207. Due to any of a variety of factors, instance store 207 can release a lock that was previously acquired by an application host. For example, due to communication failure, instance store 207 can detect that it is no longer communicating with execution thread 202A (and/or persistence provider 203) As a result, instance store 207 can release a lock previously acquired by execution thread 202A. However, also as a result of the communication failure, application host 201 and/or persistence provider 203 may have no way to know that instance store 207 released the lock. Thus, for example, execution thread 202A can continue as if it has acquired the lock indicated in lock response 213, even though the lock has in fact been released at instance store 207.

Subsequent to releasing the lock, another application host can acquire a lock on the same instance and cause a version to be updated. For example, through commands in other/commands results 217, instance 208 can be updated from version 261 (an earlier version) to version 263 (a later version). Further, this can occur during the time execution thread 202A continues based on lock response 213 but does not in fact have a lock on instance 208.

Method 400 includes an act of the persistence provider determining that the first instance and second instance are the same instance (act 407). For example, instance persistence command processor 204 can determine that lock response 213 and 214 have both requested lock acquisition on instance 208.

Method 400 includes an act of the persistence provider determining that the second instance version is a newer instance version than the first instance version (act 408). For example, instance persistence provider 204 can compare version 261 and version 263. From the comparison, instance persistence command processor 204 can determine that version 263 of instance 208 is newer than version 261 of instance 208 and thus version 261 is obsolete.

Method 400 includes an act of the persistence provider failing the first command in response to the determination that the first command is holding a lock for an obsolete instance version (act 409). For example, instance persistence command processor 204 can fail command 211 in response to determining that command 211 is holding a lock for version 261.

Failing a command may include notifying an execution thread or application host if the command was previously indicated to have completed successfully. For example, prior to the detection of the lock conflict, instance persistence command processor 204 may have indicated to execution thread 202A that command 211 completed successfully. Subsequent to the detection of the lock conflict, instance persistence command processor 204 may indicate to execution thread 202A or application host 201 that command 211 has failed. Execution thread 202A or application host 201 may take a corrective action based on the notification that command 211 has failed (e.g., by aborting the computation that execution thread 202A is performing on instance 208).

As previously described, an application host can attempt to override a lock, such as, for example, when a locked is determined to be spurious. Overriding a lock can include repeating the attempt to acquire the lock, potentially disregarding an existing lock if it is held by the application host with the specific lock version indicated by the lock conflict. Because the lock may have been freed subsequent to the second command being received by the instance store, it is possible that another application host or even the same application host has since locked the instance during resolution of the lock conflict. Accordingly, lock versioning provides a mechanism to detect that the lock in a second lock conflict is different than the lock previously indicate during a first lock conflict while attempting to acquire the lock.

As such, a second lock conflict could be either type of lock conflict (as described with respect to methods 300 and 400). Further, either type of lock conflict can be handled without knowledge of the first lock conflict. Accordingly, successive attempts are independent. For example, it is even possible to receive the response to the new command that locked the instance again before reattempting the second command. Thus, it can be determined that the lock at a new version has been received and the lock acquisition is to fail without having to go back to the instance store.

Embodiments of the invention also include resolving lock conflicts between three or more commands through simultaneous implementation of techniques similar to those described in methods 300 and 400. For example, a lock conflict between three commands can be resolved using a combination of lock versions and determining when commands were received.

Accordingly, embodiments of the invention can employ a logical lock clock maintained by the state persistence system for each persisted state storage location. Lock times can be incorporated into the bookkeeping performed by an instance persistence command processor to distinguish cases where the instance is locked by the application host at a previous logical time from cases where the instance is concurrently locked by the application host through a different name. The instance persistence command processor can additionally maintain a logical command clock for commands issued by the application host to the state persistence system, with introspection to determine which issued commands may potentially take a lock. The instance persistence command processor can then resolve conflicts by pausing command execution until the effects of potentially conflicting locking commands become visible and by examining the lock time to distinguish among multiple copies of a persisted state storage location.

For example, embodiments of the invention can be used to resolve lock conflicts caused by reordering of parallel requests. An instance persistence command processor can receive a first application message from a first execution thread for delivery to an instance. However, based on the content of the first application message the destination instance may be unclear. For example, the first application message may contain business information (such as an order number) that is part of the instance's data rather than a unique identifier for the instance itself. Even the application host may be unable to resolve the first application message to the correct destination instance. For example, even by checking the first application message for a unique instance identifier and searching the previously loaded instances for data corresponding to the business information in the message, the application host may fail to find a suitable instance. The instance store may be able to resolve the first application message to a particular instance by correlating the information in the message with the data of some instance. Therefore, the application host may ask the instance store to load the appropriate instance (or create a new instance if no appropriate instance already exists).

During essentially the same time, a second application message is received by the application host on a second parallel execution thread. The second application message may similarly not uniquely identify a destination instance. Furthermore, the second application message may contain different business information. For example, rather than containing an order number, the second application message may contain the customer's shipping address. Thus, although the two application messages may refer to the same destination instance, the application host may be unable to detect this relationship. As such, the second execution thread proceeds to ask the instance store to load the appropriate instance (or create a new instance if no appropriate instance already exists).

Due to re-ordering, the response to the second execution thread can be that the application host already has locked the relevant instance. However, the application host may have yet to receive notification of the lock. Thus, an instance persistence command processor can refer to a command log to resolve the conflict.

Other sequences of events may lead to a similar response by the instance store. For example, the application host may have aborted an execution thread or previously crashed, thus losing its record of having locked the instance while the instance store still believes that the application host has a copy. Similar races can occur when the application host on one execution thread saves and unloads an instance while simultaneously another execution thread loads the same instance. A resolution to the lock conflict must distinguish these various cases in order to consistently reconcile the state of the application host and instance store. Embodiments of the invention can be used to resolve lock conflicts resulting from these as well as other additional sequences of events.

Embodiments of the invention also include computer architectures having one or more persistence providers. Each persistence provider provides a plurality of application hosts, each with one more execution threads, with access to instances stored at an instance store. Within these embodiments, each instance persistence provider can include a command clock and the instance store can include an instance clock. Information obtained from the command clocks and from the instance clock can be used to resolve lock conflicts between application hosts based both on temporal ordering and versioning. Thus, embodiments of the invention can resolve lock conflicts between a plurality of applications hosts wherein commands are receive at different times and refer to different versions of an instance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more storage medium having stored executable instructions which, when executed by the one or more processors, implement a method for processing commands received from one or more application hosts in a manner that is suitable for addressing potential lock conflicts with instances stored in an instance store, the method comprising:
an act of maintaining a command log, the command log tracking commands submitted by the one or more application hosts for which corresponding command results have not yet been made visible to the application hosts, the one or more application hosts including a plurality of execution threads configured to issue the commands for persisting the instances to and accessing the instances from the instance store, at least a subset of the commands resulting in an execution thread requesting an instance lock during execution;
an act of receiving a first command from a first execution thread and receiving at least a second command;
determining whether each of the first command and the second command has a potential to cause a lock conflict;
upon determining whether each of the first command and the second command has the potential to cause the lock conflict, refraining from logging the second command in the command log in response to determining the second command does not have the potential to cause the lock conflict and logging the first command in the command log with log information that is subsequently used by the computing system to resolve the at least one lock conflict in response to determining the first command does have the potential to cause the lock conflict, wherein the log information includes a time stamp that indicates when the first command was received; and
an act of using the command log to resolve at least one lock conflict based at least in part on the log information maintained in the command log.

2. The computing system of claim 1, wherein the method further includes:
an act of maintaining a list of commands that will execute without requesting acquisition of an instance lock; and
an act of using the list of commands to make the determination that the first command has the potential to cause the lock conflict.

3. The computing system of claim 2, wherein the presence of the second command on the list of commands causes the determination that the second command does not have the potential to cause the lock conflict and thereby causes the computing system to responsively refrain from logging the second command in the command log.

4. The computing system of claim 1, wherein the first command is a command requesting uncoordinated read access to one or more instance in the instance store.

5. The computing system of claim 1, wherein determining the first command has the potential to cause the lock conflict is based on a determination as to whether the first command will request acquisition of a lock for an instance that is already locked.

6. The computing system of claim 5, wherein determining the first command does have the potential to cause the lock conflict is further based on a determination that there is insufficient information to determine whether the first command will request the acquisition of the lock for the already locked instance.

7. The computing system of claim 6, wherein the method further includes:
   receiving additional command information after the first command is logged as a log entry in the command log, the additional command information being operable to determine that the first command does not have the potential to cause the lock conflict; and
   removing the log entry from the command log based on the additional command information.

8. The computing system of claim 1, wherein the system is a distributed computing system that includes a plurality of different computers that are connected over a network.

9. The computing system of claim 8, wherein the computing system includes the instance store.

10. The computing system of claim 8, wherein the computing system includes the one or more application hosts.

11. The computing system of claim 1, wherein the time stamp indicates when the first command was received relative to at least one other logged command.

12. A computer storage device comprising stored executable instructions which, when executed by the one or more processors, implement a method for processing commands received from one or more application hosts in a manner that is suitable for addressing potential lock conflicts with instances stored in an instance store, the method comprising:
   an act of maintaining a command log, the command log tracking commands submitted by the one or more application hosts for which corresponding command results have not yet been made visible to the application hosts, the one or more application hosts including a plurality of execution threads configured to issue the commands for persisting the instances to and accessing the instances from the instance store, at least a subset of the commands resulting in an execution thread requesting an instance lock during execution;
   an act of receiving a first command from a first execution thread and receiving at least a second command;
   determining whether each of the first command and the second command has a potential to cause a lock conflict;
   upon determining whether each of the first command and the second command has the potential to cause the lock conflict, refraining from logging the second command in the command log in response to determining the second command does not have the potential to cause the lock conflict and logging the first command in the command log with log information that is subsequently used by the computing system to resolve the at least one lock conflict in response to determining the first command does have the potential to cause the lock conflict, wherein the log information includes a time stamp that indicates when the first command was received; and
   an act of using the command log to resolve at least one lock conflict based at least in part on the log information maintained in the command log.

13. The computer storage device of claim 12, wherein determining whether the first command has the potential to cause the lock conflict is based on whether the first command will request acquisition of a lock for an instance that is already locked, and wherein the method further includes:
   an act of maintaining a list of commands that will execute without requesting acquisition of an instance lock; and
   an act of using the list of commands to make the determination, and wherein the presence of the second command on the list of commands causes a determination that the second command does not have the potential to cause the lock conflict and wherein the absence of the first command on the list of commands causes a determination that the first command does have the potential to cause the lock conflict.

14. The computer storage device of claim 12, wherein determining whether the first command has the potential to cause the lock conflict is based on whether the first command will request acquisition of a lock for an instance that is already locked, and wherein the method further includes determining the first command has the potential to cause the lock conflict based on a determination that there is insufficient information to determine that the first command will not request the acquisition of the lock for the already locked instance.

15. The computer storage device of claim 12, wherein the method includes:
   logging the first command in the command log as a log entry in response to determining the first command does have the potential to cause the lock conflict; and
   removing the log entry from the command log once it is subsequently determined that the first command no longer has the potential to cause the lock conflict.

16. The computer storage device of claim 12, wherein the time stamp indicates when the first command was received relative to at least one other logged command.

17. A computer-implemented method for processing commands received from one or more application hosts in a manner that is suitable for addressing potential lock conflicts with instances stored in an instance store, the method comprising:
   a computing system maintaining a command log, the command log tracking commands submitted by the one or more application hosts for which corresponding command results have not yet been made visible to the application hosts, the one or more application hosts including a plurality of execution threads configured to issue the commands for persisting the instances to and accessing the instances from the instance store, at least a subset of the commands resulting in an execution thread requesting an instance lock during execution;
   the computing system receiving first command from a first execution thread and receiving at least a second command;
   the computing system determining whether each of the first command and the second command has a potential to cause a lock conflict;
   the computing system, upon determining whether each of the first command and the second command has the potential to cause the lock conflict, refraining from logging the second command in the command log in response to determining the second command does not have the potential to cause the lock conflict and logging the first command in the command log with log information that is subsequently used by the computing system to resolve the at least one conflict in response to determining the first command does have the potential to cause the lock conflict, wherein the log information includes a time stamp that indicates when the first command was received; and the computing system using the command log to resolve at least one lock conflict based at least in part on the log information maintained in the command log.

18. The method of claim 17, wherein the method further includes:

the computing system logging the first command in the command log as a log entry in response to determining the first command has the potential to cause the first lock conflict; and the computing system receiving the second command from a second execution thread.

19. The method of claim 17, wherein the time stamp indicates when the first command was received relative to at least one other logged command.

* * * * *